(12) United States Patent
Choi et al.

(10) Patent No.: US 11,011,804 B2
(45) Date of Patent: May 18, 2021

(54) BATTERY MODULE

(71) Applicant: LG CHEM, LTD., Seoul (KR)

(72) Inventors: Hang-June Choi, Daejeon (KR); Han-Jong Yoon, Daejeon (KR); Kang-Il Lee, Daejeon (KR)

(73) Assignee: LG Chem, Ltd., Seoul (KR)

( * ) Notice: Subject to any disclaimer, the term of this patent is extended or adjusted under 35 U.S.C. 154(b) by 120 days.

(21) Appl. No.: 16/345,862

(22) PCT Filed: Jul. 13, 2018

(86) PCT No.: PCT/KR2018/007986
§ 371 (c)(1),
(2) Date: Apr. 29, 2019

(87) PCT Pub. No.: WO2019/013591
PCT Pub. Date: Jan. 17, 2019

(65) Prior Publication Data
US 2020/0194768 A1    Jun. 18, 2020

(30) Foreign Application Priority Data

Jul. 14, 2017 (KR) .................. 10-2017-0089717
Jul. 12, 2018 (KR) .................. 10-2018-0081313

(51) Int. Cl.
*H01M 50/531* (2021.01)
*B23K 26/22* (2006.01)
(Continued)

(52) U.S. Cl.
CPC ........... *H01M 50/531* (2021.01); *B23K 26/22* (2013.01); *H01M 50/20* (2021.01);
(Continued)

(58) Field of Classification Search
CPC ........ H01M 2/202; H01M 2/206; H01M 2/22; H01M 2/26; H01M 2220/20; H01M 50/20;
(Continued)

(56) References Cited

U.S. PATENT DOCUMENTS

2009/0223940 A1* 9/2009 Hosoya ............. H01R 43/0221
                                                            219/121.64
2011/0081569 A1* 4/2011 Kim .................... H01M 2/206
                                                            429/158
(Continued)

FOREIGN PATENT DOCUMENTS

JP    2012-109275 A    6/2012
JP    2012-125829 A    7/2012
(Continued)

OTHER PUBLICATIONS

EPO website (www.espacenet.com) machine translation of the detailed description of JP 2012-109275A. (Year: 2012).*

(Continued)

*Primary Examiner* — Gregg Cantelmo
(74) *Attorney, Agent, or Firm* — Morgan, Lewis & Bockius LLP

(57) ABSTRACT

Provided is a battery module in which weldability between electrode leads and/or between an electrode lead and a bus bar is improved. The battery module includes: a cell assembly that includes a plurality of secondary batteries stacked in at least one direction, respectively including electrode leads, and electrically connected to each other via a connection between the electrode leads; and at least one bus bar that includes an electrically conductive material and is electrically connected by contacting the electrode leads of the plurality of secondary batteries, wherein at least one of the electrode leads is combined and fixed to at least one of another electrode lead and the at least one bus bar, which are (Continued)

contacted by the at least one of the electrode leads, via a welding spot formed in a tornado shape.

10 Claims, 15 Drawing Sheets

(51) Int. Cl.
*H01M 50/20* (2021.01)
*H01M 50/502* (2021.01)
*H01M 50/528* (2021.01)

(52) U.S. Cl.
CPC ....... *H01M 50/502* (2021.01); *H01M 50/528* (2021.01); *H01M 2220/20* (2013.01)

(58) Field of Classification Search
CPC ............ H01M 50/502; H01M 50/528; H01M 50/531; H01M 50/211; H01M 50/249; H01M 50/509; H01M 50/516; H01M 50/548; B60L 50/64; B23K 26/04; B23K 26/22
USPC ............ 219/121.63, 121.76, 121.78, 121.79
See application file for complete search history.

(56) References Cited

U.S. PATENT DOCUMENTS

| | | | |
|---|---|---|---|
| 2016/0285068 A1* | 9/2016 | Beugnon | H01M 2/26 |
| 2017/0106470 A1 | 4/2017 | Solomon et al. | |
| 2017/0125774 A1 | 5/2017 | Choi et al. | |

FOREIGN PATENT DOCUMENTS

| | | |
|---|---|---|
| JP | 5527526 B2 | 6/2014 |
| JP | 5609595 B2 | 10/2014 |
| JP | 2015-047625 A | 3/2015 |
| JP | 2015-153464 A | 8/2015 |
| KR | 10-2002-0056496 A | 7/2002 |
| KR | 10-2015-0113827 A | 10/2015 |
| WO | 2016/128704 A2 | 8/2016 |

OTHER PUBLICATIONS

International Search Report dated Oct. 23, 2018, issued in corresponging International Patent Application No. PCT/KR2018/007986.
Office Action dated May 28, 2020, issued in corresponding Korean Patent Application No. 10-2018-0081313.
Extended European Search Report dated Jun. 19, 2020, issued in corresponding EP Patent Application No. 18832083.2. Note: Filed herewith is a machine English translation of JP2012-125829A (cited in the EESR but already of record in the present application).

* cited by examiner

FIG. 15

| SAMPLE | TENSILE STRENGTH[kgf] | AVERAGE TENSILE STRENGTH[kgf] | COMPARED TO BASE MATERIAL STRENGTH[%] |
|---|---|---|---|
| EXAMPLE 1 | 47.170 | 47.530 | 82.99 |
| EXAMPLE 2 | 48.935 | | |
| EXAMPLE 3 | 46.484 | | |
| COMPARATIVE EXAMPLE 1 | 37.756 | 40.371 | 70.49 |
| COMPARATIVE EXAMPLE 2 | 41.384 | | |
| COMPARATIVE EXAMPLE 3 | 41.972 | | |

FIG. 16
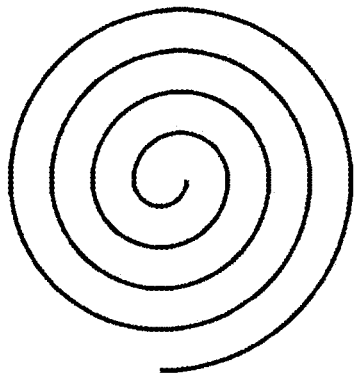
FIG. 17
| SAMPLE | TENSILE STRENGTH[kgf] |
|---|---|
| EXAMPLE 4 | 134.25 |
| EXAMPLE 5 | 136.70 |
| EXAMPLE 6 | 136.75 |
| EXAMPLE 7 | 134.75 |
| EXAMPLE 8 | 129.50 |
| EXAMPLE 9 | 136.95 |
FIG. 18
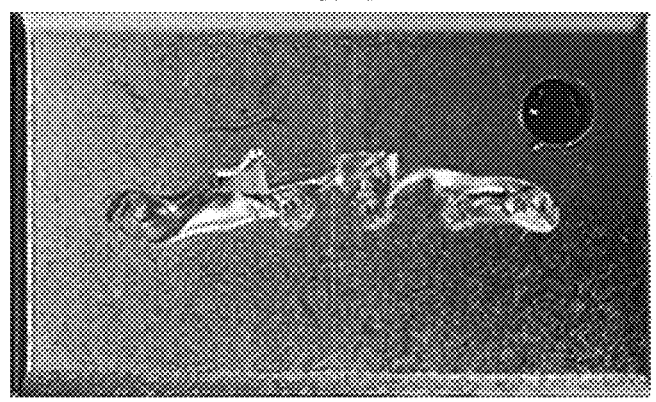

FIG. 19

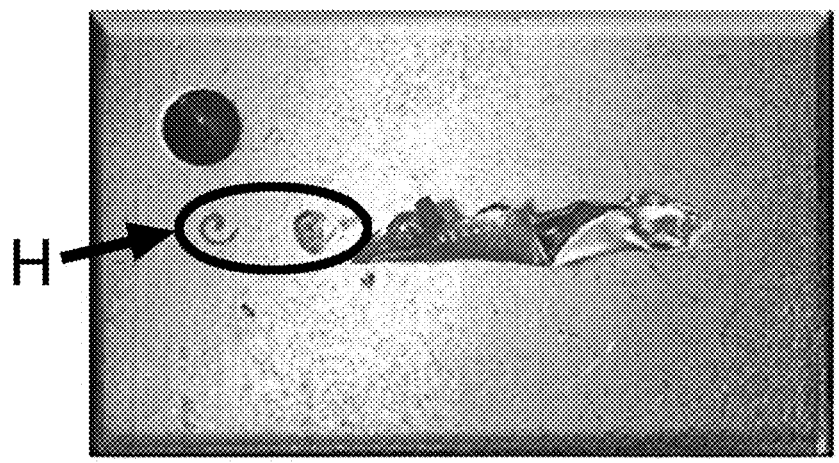

FIG. 20

| EXAMPLE No. | COMPARATIVE EXAMPLE No. | Gap[mm] |
|---|---|---|
| EXAMPLE 12 | COMPARATIVE EXAMPLE 4 | 0.04 |
| EXAMPLE 13 | COMPARATIVE EXAMPLE 5 | 0.08 |
| EXAMPLE 14 | COMPARATIVE EXAMPLE 6 | 0.12 |
| EXAMPLE 15 | COMPARATIVE EXAMPLE 7 | 0.16 |
| EXAMPLE 16 | COMPARATIVE EXAMPLE 8 | 0.2 |
| EXAMPLE 17 | COMPARATIVE EXAMPLE 9 | 0.24 |
| EXAMPLE 18 | COMPARATIVE EXAMPLE 10 | 0.28 |
| EXAMPLE 19 | COMPARATIVE EXAMPLE 11 | 0.32 |
| EXAMPLE 20 | COMPARATIVE EXAMPLE 12 | 0.36 |
| EXAMPLE 21 | COMPARATIVE EXAMPLE 13 | 0.4 |
| EXAMPLE 22 | COMPARATIVE EXAMPLE 14 | 0.44 |
| EXAMPLE 23 | COMPARATIVE EXAMPLE 15 | 0.48 |
| EXAMPLE 24 | COMPARATIVE EXAMPLE 16 | 0.52 |
| EXAMPLE 25 | COMPARATIVE EXAMPLE 17 | 0.56 |
| EXAMPLE 26 | COMPARATIVE EXAMPLE 18 | 0.6 |

FIG. 21

| EXAMPLE No. | Visual Defect | COMPARATIVE EXAMPLE No. | Visual Defect |
|---|---|---|---|
| EXAMPLE 12 | × | COMPARATIVE EXAMPLE 4 | × |
| EXAMPLE 13 | × | COMPARATIVE EXAMPLE 5 | × |
| EXAMPLE 14 | × | COMPARATIVE EXAMPLE 6 | × |
| EXAMPLE 15 | × | COMPARATIVE EXAMPLE 7 | ○ |
| EXAMPLE 16 | × | COMPARATIVE EXAMPLE 8 | ○ |
| EXAMPLE 17 | × | COMPARATIVE EXAMPLE 9 | ○ |
| EXAMPLE 18 | × | COMPARATIVE EXAMPLE 10 | ○ |
| EXAMPLE 19 | × | COMPARATIVE EXAMPLE 11 | ○ |
| EXAMPLE 20 | ○ | COMPARATIVE EXAMPLE 12 | ○ |
| EXAMPLE 21 | ○ | COMPARATIVE EXAMPLE 13 | ○ |
| EXAMPLE 22 | ○ | COMPARATIVE EXAMPLE 14 | ○ |
| EXAMPLE 23 | ○ | COMPARATIVE EXAMPLE 15 | ○ |
| EXAMPLE 24 | ○ | COMPARATIVE EXAMPLE 16 | ○ |
| EXAMPLE 25 | ○ | COMPARATIVE EXAMPLE 17 | ○ |
| EXAMPLE 26 | ○ | COMPARATIVE EXAMPLE 18 | ○ |

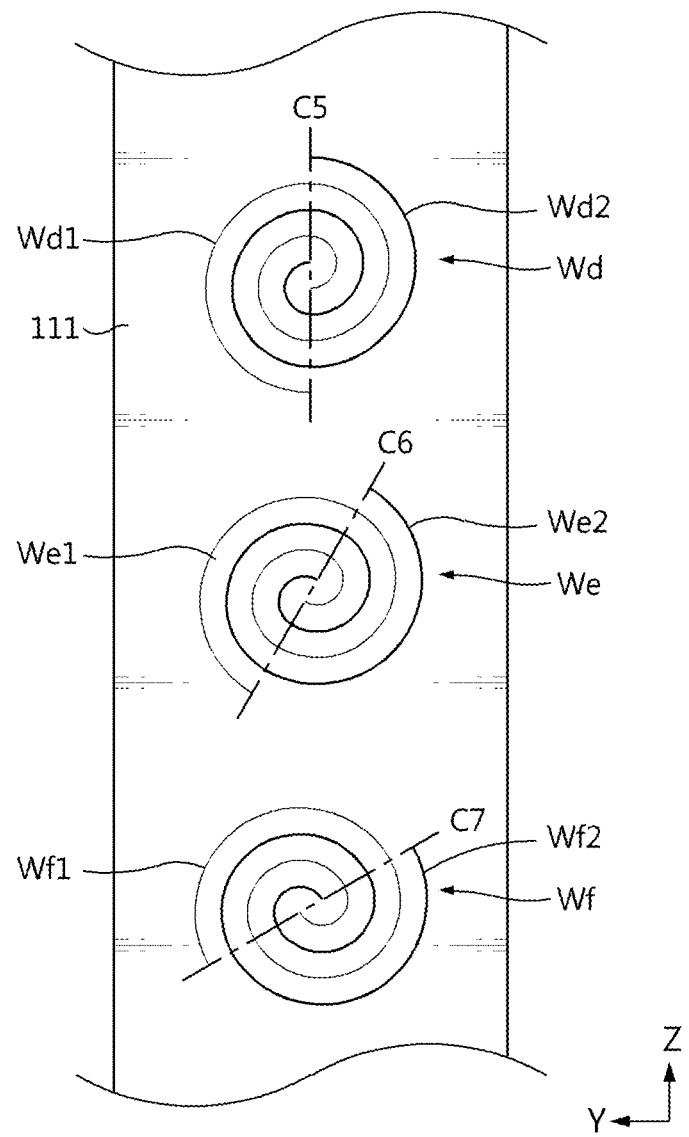

BATTERY MODULE

TECHNICAL FIELD

The present application claims priority to Korean Patent Application No. 10-2017-0089717 filed on Jul. 14, 2017 and Korean Patent Application No. 10-2018-0081313 filed on Jul. 12, 2018 in the Republic of Korea, the disclosures of which are incorporated herein by reference.

The present disclosure relates to a battery module, and more particularly, to a battery module having improved weldability of an electric connection structure, and a battery pack and a vehicle, which include the battery module.

BACKGROUND ART

Recently, demands for portable electronic products, such as laptop computers, smart phones, smart watches, etc. have rapidly increased, and development of batteries for energy storage, robots, and satellites, etc. has regularized, and thus studies on high performance secondary batteries capable of repetitive charging and discharging are actively conducted.

Currently commercialized secondary batteries include nickel cadmium batteries, nickel hydrogen batteries, nickel zinc batteries, and lithium secondary batteries, and thereamong, the lithium secondary batteries are in the limelight because the lithium secondary batteries have almost no memory effect compared to a nickel-based secondary battery and thus is free of being charged and discharged, has a very low self-discharge rate, and has high energy density.

In such a lithium secondary battery, a lithium-based oxide and a carbon material are respectively mainly used as a positive electrode active material and a negative electrode active material. The lithium secondary battery includes an electrode assembly, in which a positive electrode plate and a negative electrode plate on which the positive electrode active material and the negative electrode active material are respectively coated are arranged with a separator therebetween, and an exterior material, i.e., a battery case, sealing and accommodating the electrode assembly with an electrolyte solution.

Generally, the lithium secondary battery may be classified into a can-type secondary battery, in which the electrode assembly is embedded in a metal can, and a pouch-type secondary battery, in which the electrode assembly is embedded in a pouch of an aluminum laminate sheet.

Recently, the secondary batteries are widely used not only in a small-sized apparatus, such as a portable electronic device, but also in medium- and large-sized apparatuses, such as a vehicle or a power storage apparatus. In particular, with the gradual depletion of carbon energy and the increase in the interest in an environment, attention is focused on hybrid vehicles and electric vehicles worldwide including US, Europe, Japan, and Korea. The most important component in the hybrid vehicle or electric vehicle is a battery pack that provides a driving power to a vehicle motor. Since the hybrid vehicle or electric vehicle obtains the driving power via charging and discharging of the battery pack, fuel efficiency is excellent compared to a vehicle using only an engine and pollutants are not discharged or reduced, and thus users are steadily increasing.

Most battery packs, in particular, medium- and large-sized battery packs for hybrid vehicles, electric vehicles, or energy storage systems (ESSs), include a plurality of secondary batteries, and such plurality of battery packs are connected to each other in series and/or parallel to for improvement in capacity and output. In addition, a pouch type secondary battery is mostly used in the medium- and large-sized battery packs owing to advantages, such as easy stacking, a light weight, and a possibility that a large number of pouch type secondary batteries can be included, etc.

In such a pouch type secondary battery, an electric connection between secondary batteries is mostly configured by directly contacting electrode leads to each other. Here, In order to connect the secondary batteries in parallel, the electrode leads of same polarity are connected to each other, and in order to connect the secondary batteries in series, the electrode leads of different polarities are connected to each other.

Also, for an electric connection and/or voltage sensing of the secondary battery, a bus bar may be bonded to the electrode lead, in particular, at least two electrode leads. At this time, the electrode lead and the bus bar may be bonded often via a welding method.

FIG. 1 is a partial perspective view schematically showing a configuration in which an electrode lead and a bus bar are welded to each other in a general battery module. Also, FIG. 2 is a cross-sectional view taken along a line A1-A1' of FIG. 1, in which a welded portion is illustrated.

Referring to FIGS. 1 and 2, when two electrode leads 10 and one bus bar 20 are welded to each other in the general battery module, the welding is mostly performed in a linear form as indicated by a reference character A2. Also, a length direction of a welding line at this time is a width direction of an electrode lead.

However, according to such general welding between the electrode lead 10 and the bus bar 20, weldability is low. In particular, such welding is performed mainly via a laser welding method, and since a welded portion is very hardened by a laser beam, the welding portion may be vulnerable to an impact or vibration.

Furthermore, according to such a general welding configuration, when a pore or crack is generated inside the welded portion, the crack may very rapidly grow due to external vibration or an impact. For example, when a crack is generated at a point A3 of FIG. 1, the crack may be quickly enlarged in a direction indicated by an arrow A4, i.e., a length direction of a welding line, by vibration or an impact.

In particular, a direction to which an external force is applied may be a direction perpendicular to the welding line (a left-and-right direction of FIG. 1), and in this case, a cross-sectional area of the welded portion is small in the direction to which the external force is applied, and thus welding targets may be detached from each other even in a low tensile force. Furthermore, according to a general linear welding configuration, a crack often starts from one end of the welding line. Then, the crack may continuously grow along the welding line.

Moreover, according to such a general linear welding configuration, welding strength at one end may be decreased. For example, in the configuration of FIG. 1, welding may be performed as a laser beam is irradiated from one end of the welding line continuously to the other end, but sufficient heat may not be transferred to an electrode lead at a portion where the welding starts, and thus welding strength may be decreased.

As such, according to a general welding configuration between electrode leads and/or between an electrode lead and a bus bar, weldability is low and particularly, vulnerability to vibration or an impact is high. Moreover, when the battery module is applied to a vehicle, the battery module is exposed to a large amount of vibration or impact, and thus weldability for a connection of the electrode lead and/or bus bar needs to be stably secured.

DISCLOSURE

Technical Problem

The present disclosure is designed to solve the problems of the related art, and therefore the present disclosure is directed to providing a battery module in which weldability between electrode leads and/or between an electrode lead and a bus bar is improved, and a battery pack and a vehicle, which include the battery module.

These and other objects and advantages of the present disclosure may be understood from the following detailed description and will become more fully apparent from the exemplary embodiments of the present disclosure. Also, it will be easily understood that the objects and advantages of the present disclosure may be realized by the means shown in the appended claims and combinations thereof.

Technical Solution

In one aspect of the present disclosure, there is provided a battery module including: a cell assembly that includes a plurality of secondary batteries stacked in at least one direction, respectively including electrode leads, and electrically connected to each other via a connection between the electrode leads; and at least one bus bar that includes an electrically conductive material and is electrically connected by contacting the electrode leads of the plurality of secondary batteries, wherein at least one of the electrode leads is combined and fixed to at least one of another electrode lead and the bus bar, which are contacted by the at least one of the electrode leads, via a welding spot formed in a tornado shape.

The welding spot may be configured in a shape including a plurality of welding lines in a spiral form.

The welding spot may be configured in a shape in which the plurality of welding lines have a same rotating direction and at least a portion of one of the plurality of welding lines is inserted between another one of the plurality of welding lines.

The welding spot may be configured such that a straight line connecting an inner end of each of the plurality of welding lines and a straight line connecting an outer end of each of the plurality of welding lines are parallel to each other.

The welding spot may be configured such that inner ends of the plurality of welding lines are connected to each other.

A plurality of the welding spots may be provided with respect to a single electrode lead.

The plurality of welding spots provided with respect to the single electrode lead may be configured such that outer ends are positioned on one straight line.

The welding spot may be configured to weld one bus bar and a plurality of electrode leads that are stacked on each other.

The electrode leads may each include a concave portion formed concavely in an inward direction, and at least a portion of the welding spot may be positioned in the concave portion.

In another aspect of the present disclosure, there is provided a battery pack including the battery module.

In another aspect of the present disclosure, there is provided a vehicle including the battery module.

Advantageous Effects

According to the present disclosure, weldability between electrode leads and/or between an electrode lead and a bus bar may be increased and welding strength may be improved.

In particular, according to an aspect of the present disclosure, in a configuration in which electrode leads are combined to each other and welded in a length direction, when a force is applied in the length direction of the electrode leads, a welding area may be increased in a direction such a force is applied. Accordingly, according to such an aspect of the present disclosure, tensile strength with respect to a connecting portion between electrode leads and/or between an electrode lead and a bus bar may be improved.

Also, according to an aspect of the present disclosure, a welding area may be increased in a bonded surface between electrode leads and/or between an electrode lead and a bus bar, and thus tensile strength of a welded portion may be improved.

Also, according to an aspect of the present disclosure, even when a crack is generated at a certain point of a welding line, the crack may be effectively prevented from largely growing.

Furthermore, even when a battery module according to the present disclosure is applied to an apparatus that is frequently exposed to an impact or vibration, such as an electric vehicle, a welding state of an electric connection structure may be stably maintained.

DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing.

FIG. 15 shows results of measuring tensile strength with respect to several examples of the present disclosure and comparative example samples.

FIG. 16 is a diagram schematically showing a welding configuration of electrode leads, according to another embodiment of the present disclosure.

FIG. 17 shows results of measuring tensile strength with respect to several different examples of the present disclosure.

FIG. 18 is an image captured to determine detachment according to measurement of tensile strength with respect to an embodiment of the present disclosure.

FIG. 19 is an image captured to determine detachment according to measurement of tensile strength with respect to another embodiment of the present disclosure.

FIG. 20 shows intervals between an electrode lead and a bus bar, which are applied with respect to several examples of the present disclosure and comparative example samples.

FIG. 21 shows results of measuring defects observed with naked eyes with respect to the several examples of the present disclosure and the comparative example samples of FIG. 20.

FIG. 23 is a diagram schematically showing a configuration of a plurality of welding spots included in an electrode lead in a battery module, according to another embodiment of the present disclosure.

MODE FOR DISCLOSURE

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

Therefore, the description proposed herein is just a preferable example for the purpose of illustrations only, not intended to limit the scope of the disclosure, so it should be understood that other equivalents and modifications could be made thereto without departing from the scope of the disclosure.

Figure 3:
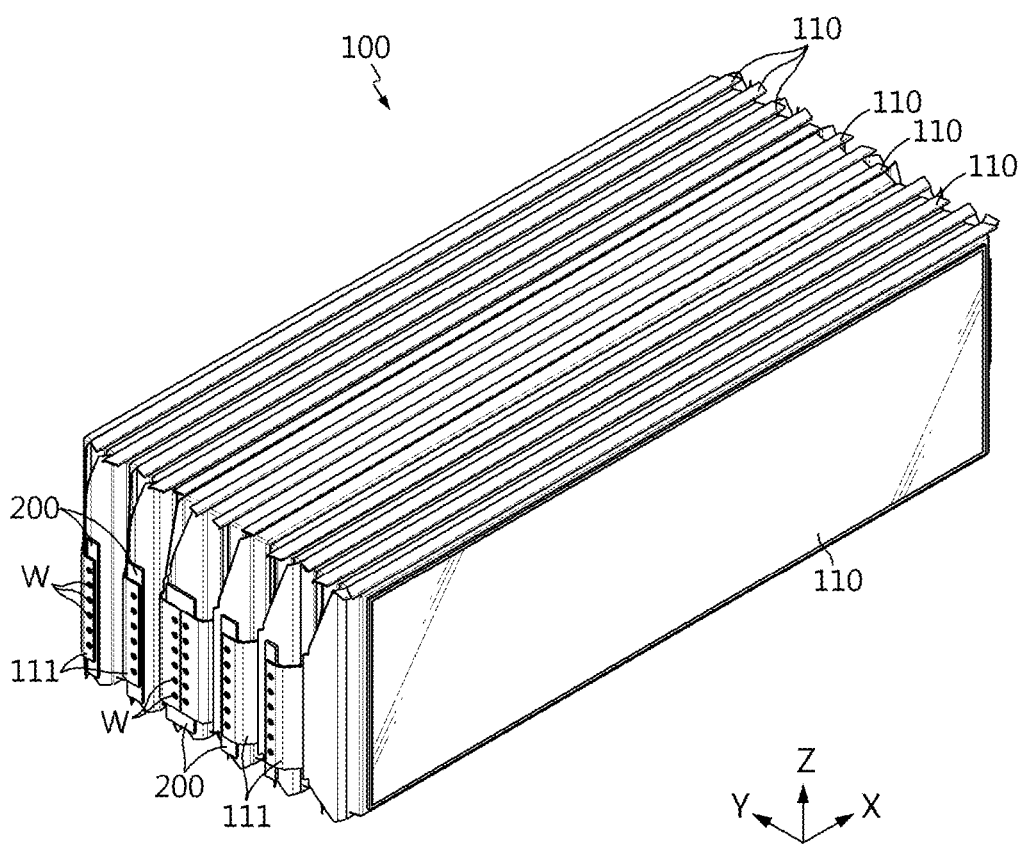
FIG. 3 is a perspective view schematically showing a configuration of a battery module, according to an embodiment of the present disclosure.

FIG. 3 is a perspective view schematically showing a configuration of a battery module, according to an embodiment of the present disclosure. Also, FIG. 4 is a view of a configuration of a battery module according to an embodiment of the present disclosure, which is viewed from the front.

Figure 4:
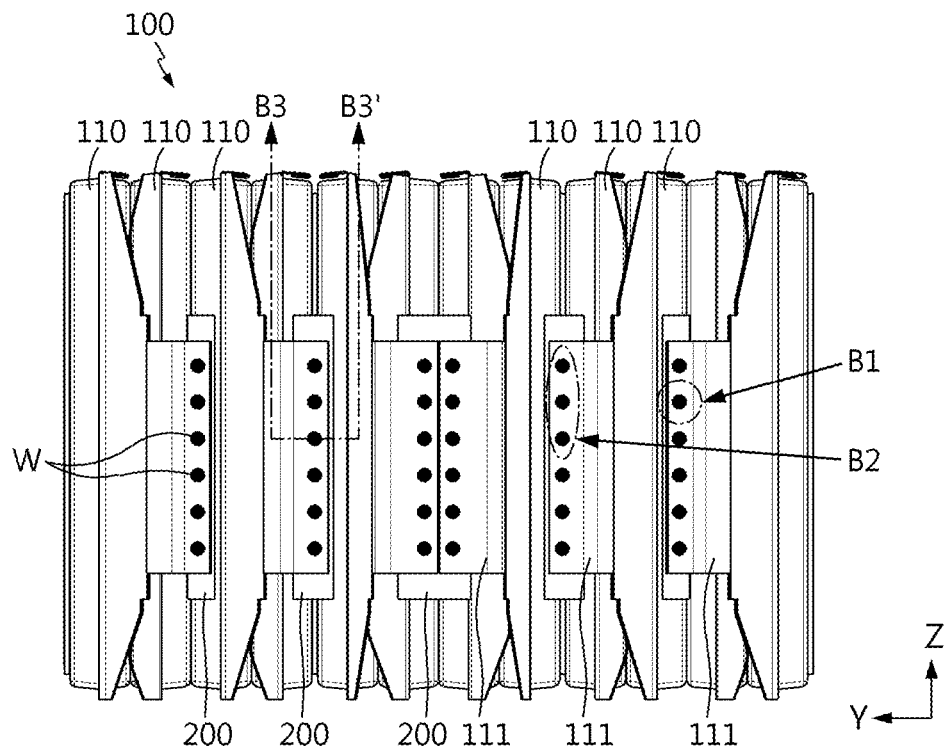
FIG. 4 is a view of a configuration of a battery module according to an embodiment of the present disclosure, which is viewed from the front.

Referring to FIGS. 3 and 4, the battery cell module according to the present disclosure may include a cell assembly 100 and a bus bar 200.

The cell assembly 100 may include a plurality of secondary batteries 110. In particular, the cell assembly 100 may include a plurality of pouch type secondary batteries as the secondary batteries 110. Such a pouch type secondary battery 110 may include an electrode assembly, an electrolyte, and a pouch exterior material.

Here, the electrode assembly may be configured in a shape in which at least one positive electrode plate and at least one negative electrode plate are arranged with a separator therebetween. In particular, the electrode assembly, may be classified into a jelly-roll type in which one positive electrode plate and one negative electrode plate are rolled together with a separator, and a stack type in which a plurality of positive electrode plates and a plurality of negative electrode plates are alternately stacked with a separator therebetween.

Also, the pouch exterior material may be configured in a shape including an outer insulating layer, a metal layer, and an inner adhesive layer. In particular, the pouch exterior material may be configured in a shape including a metal thin film (the metal layer), for example, an aluminum thin film, so as to protect internal components, such as the electrode assembly, an electrolyte solution, and the like, improve electrochemical properties by the electrode assembly and the electrolyte solution, and enhance heat dissipation properties, and the like. Such an aluminum thin film may be provided between insulating layers (the outer insulating layer and the inner adhesive layer) including an insulating material so as to secure electric insulation with components inside the secondary battery 110, such as the electrode assembly and the electrolyte solution, or with other components outside the secondary battery 110.

In particular, the pouch exterior material may include two pouches, and at least one of the two pouches may have an internal space having a concave shape. Also, an electrode assembly may be accommodated in the internal space thereof. Here, sealing portions may be provided on outer circumferences of the two pouches and the internal space in which the electrode assembly is accommodated may be when the sealing portions are combined to each other.

The battery module according to an embodiment of the present disclosure may employ various types of pouch secondary batteries well-known at the time of filing of the present disclosure. Accordingly, detailed descriptions about an internal configuration of the secondary battery 110 provided in the cell assembly 100 are omitted.

The plurality of pouch type secondary batteries 110 may be stacked in at least one direction, for example, in a left-and-right direction (Y-axis direction of the drawing) as illustrated. At this time, each pouch type secondary battery 110 may be configured to be upright in an top-and-bottom direction (Z-axis direction of the drawing) with respect to the ground (X-Y plane of the drawing), i.e., may be configured such that wide surfaces face left and right sides and the sealing portions are positioned top, bottom, back, and front sides. Also, in this case, the secondary batteries 110 may be arranged such that the wide surfaces face each other.

Meanwhile, in the present specification, assuming that a side where an electrode lead 111 is shown in FIG. 3 is defined to be a front surface of the battery module, top, bottom, left, right, front, and back directions are defined from a viewpoint where the front surface is viewed, unless specifically described.

Each secondary battery 110 provided in the cell assembly 100 may include the electrode lead 111. The electrode lead 111 includes a positive electrode lead and a negative electrode lead, and may function as an electrode terminal of the secondary battery 110. Moreover, in the pouch type secondary battery 110, the electrode lead 111 may have a plate shape and protrude outside the pouch exterior. In the battery module according to the present disclosure, the electrode lead 111 of each secondary battery may be configured to protrude to the front (−X-axis direction of the drawing) or to the back (+X-axis direction of the drawing) of the cell assembly 100 from at least one of a front end portion and a rear end portion of the cell assembly 100. In order to function as a terminal of a battery, the electrode lead 111 may be formed of a metallic material, such as aluminum or copper. Such an electrode lead 111 may be formed in various thicknesses. For example, the electrode lead 111 may have a thickness of 0.1 mm to 1 mm. In detail, the electrode lead 111 may have a thickness of 0.2 mm to 0.6 mm. Also, the electrode lead 111 may be configured to have various widths. For example, the electrode lead 111 may be configured to have a width of 20 mm to 60 mm. However, it is obvious that the thickness or width of the electrode lead 111 may be variously configured according to a specification, a type, or the like of a battery or battery pack.

In the cell assembly 100, the secondary batteries 110 may be electrically connected to each other as the electrode leads 111 are connected to each other.

For example, the plurality of secondary batteries 110 may be connected to each other in series or in parallel as the electrode leads 111 directly contact each other. As another example, the plurality of secondary batteries 110 may be connected to each other in series or in parallel as the electrode leads 111 are indirectly connected to each other through the bus bar 200.

The bus bar 200 may be electrically connected to the electrode lead 111 of the secondary battery 110 by contacting the electrode lead 111 of the secondary battery 110. In particular, the bus bar 200 may electrically connect the electrode leads 111 to each other by being connected to the at least two electrode leads 111. Also, the bus bar 200 may directly contact and be connected to the at least one electrode lead 111 to measure an electric characteristic at the contacted electrode lead 111. For example, the bus bar 200 may sense a voltage at both ends with respect to the at least one secondary battery 110.

As such, the bus bar 200 may include an electrically conductive material so as to be electrically connected to the electrode lead 111 of the secondary battery 110. For example, the bus bar 200 may include a metallic material, such as copper or aluminum.

Also, the bus bar 200 may have a plate shape or a bar shape similarly to the electrode lead 111. Here, the bus bar 200 may be formed to have a thickness thicker than that of the electrode lead 111. For example, the bus bar 200 may be configured to have a thickness of 0.3 mm to 4 mm. In detail, comparing the thicknesses of the bus bar 200 and electrode lead 111, when the thickness of the electrode lead 111 is 0.2 mm to 0.4 mm, the thickness of the bus bar 200 may be 0.6 mm to 3 mm. However, the thickness of the bus bar 200 may be variously configured according to a specification, a type, or the like of a battery or battery pack, and the present disclosure is not limited to a certain thickness of the bus bar 200.

As described above, the electrode lead 111 provided in each secondary battery 110 of the cell assembly 100 may be combined and fixed to the bus bar 200. Also, the electrode lead 111 of the secondary battery 110 provided in the cell assembly 100 may be combined and fixed to another electrode lead 111, i.e., to the electrode lead 111 of another secondary battery 110 provided in the cell assembly 100. At this time, the electrode lead 111 and the bus bar 200 and/or the electrode leads 111 may be combined and fixed to each other via welding performed between the electrode lead 111 and the bus bar 200 and/or between the electrode leads 111. The welding at this time may be performed via a laser welding method in which an object to be welded is welded as a laser beam is irradiated. In other words, a region between the electrode leads 111 and/or a region between the electrode lead 111 and the bus bar 200 may be configured in a laser-welded form.

The electrode lead 111 of the plurality of secondary batteries 110 provided in the cell assembly 100 may contact another electrode lead 111 or the bus bar 200. At this time, at least one electrode lead 111 among the plurality of electrode leads 111 provided in the cell assembly 100 may be combined and fixed to at least one of the other contacted electrode lead 111 and the contacted bus bar 200 via a welding spot W formed in a tornado shape.

For example, when the at least two electrode leads 111 are stacked on each other in a face-to-face contacting manner, the contacting electrode leads 111 may be combined and fixed to each other by the welding spot W. Also, when at least one electrode lead 111 is stacked on the bus bar 200 in a face-to-face contacting manner, the electrode lead 111 and the bus bar 200 may be combined and fixed to each other by the welding spot W. In particular, the welding spot W at this time may be formed in a tornado shape. A configuration of the welding spot W having the tornado shape is described in detail with reference to FIG. 5.

Figure 5:
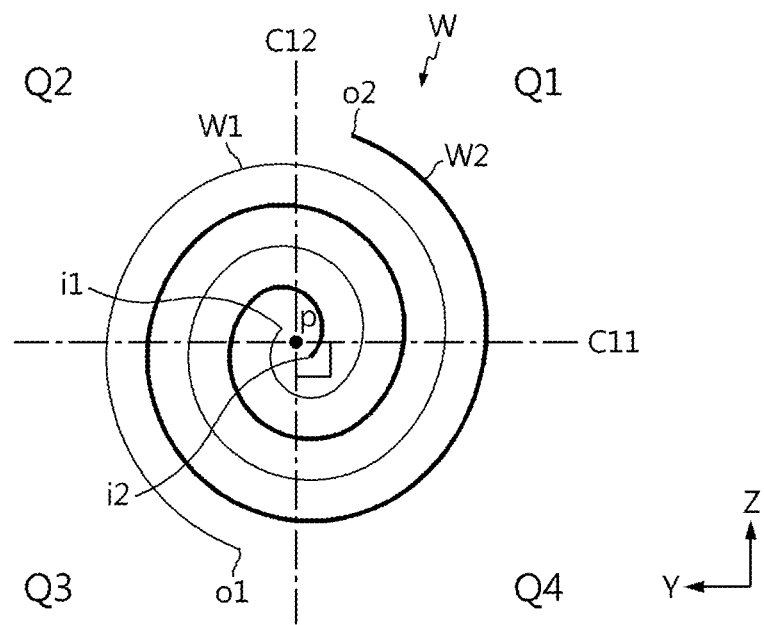
FIG. 5 is a diagram schematically showing a configuration of a welding spot applied to an electrode lead of a battery module according to the present disclosure.

FIG. 5 is a diagram schematically showing a configuration of the welding spot W applied to an electrode lead of a battery module according to the present disclosure. For example, FIG. 5 is an enlarged view of a region B1 of FIG. 4.

Referring to FIG. 5, in the welding spot W applied to an electrode lead, a welding line may be configured in a tornado shape. Here, the welding line is a path on which a laser beam having energy equal to or higher than a certain output is irradiated, and objects to be welded may be welded to each other based on the welding line. In particular, in the present disclosure, the welding line may be formed in a curved line instead of a linear line, and moreover, such a curved line may be formed in a whirlwind (twister) shape. In other words, the welding line may be configured to proceed from an outer portion to a center portion of the welding spot W, as at least a part of the welding line rotates in a clockwise direction or a counterclockwise direction. In other words, the welding line may be configured in a shape drawing circles whose diameter is gradually decreasing. Here, the welding line may be formed in a shape in which a laser irradiating path moves in a direction from the outside to the inside (center portion) or in a direction from the inside to the outside.

As such, the welding spot W welding between electrode leads and/or between an electrode lead and a bus bar may be configured in a tornado shape. According to such a welding configuration, welding strength between objects to be welded, i.e., between the electrode leads and/or between the electrode lead and the bus bar, may be improved. In particular, according to the configuration of the welding spot W having the tornado shape, welding portion may be uniformly and widely formed regardless of a direction to which an external force is applied. Accordingly, the welding portion may be stably maintained despite of vibration or an impact from several directions.

Preferably, in the battery module according to the present disclosure, the welding spot W applied to the electrode lead 111 and/or the bus bar 200 may include a plurality of welding lines formed in a spiral shape.

For example, referring to FIG. 5, one welding spot W may include two welding lines, i.e., a first welding line indicated by a reference sign W1 and a second welding line indicated by a reference sign W2. Here, the first welding line W1 and the second welding line W2 may have different outer end portions. In other words, as shown in FIG. 5, an outer end portion of the first welding line W1 indicated by a reference sign of and an outer end portion of the second welding line W2 indicated by a reference sign o2 may be separately formed and positioned at different locations.

In this case, it may be said that a plurality of different spirals, for example, two spirals, form one tornado, i.e., one welding spot.

As such, when two welding lines, i.e., two spirals, form one tornado, inner end portions of the spirals may be positioned at different locations. For example, as shown in FIG. 5, an inner end portion i1 of the first welding line W1 and an inner end portion i2 of the second welding line W2 may be positioned at the center portion of the welding spot W, and at this time, the two inner end portions i1 and i2 may be separated from each other. In this case, it may be said that the first welding line W1 and the second welding line W2 are separated from each other without a connecting portion.

Here, the welding spot W may be configured such that the plurality of welding lines included therein have the same rotating direction. For example, in the configuration of FIG. 5, the two welding lines, i.e., the first welding line W1 and the second welding line W2 may both be configured such that a direction from the outside to inside is a clockwise direction.

Also, at least a part of one welding line at this time may be inserted between the other welding line. For example, in the configuration of FIG. 5, the first welding line W1 may be partially inserted between the second welding line W2.

As such, according to the welding configuration in which the plurality of welding lines in a spiral form formed one welding spot W, i.e., one tornado, a welding performance may be higher compared to a welding configuration in which one welding line in a spiral form forms one welding spot.

For example, in the configuration of FIG. 5, when a welding spot is configured only by the first welding line W1 without the second welding line W2, welding strength of an outer portion or an inner portion of the welding spot may somewhat decrease according to a welding direction. For example, when a laser irradiating path is formed in a direction from the outer end portion o1 to the inner end portion i1 of the first welding line W1, heat by a laser beam may not be sufficiently transferred to an electrode lead or bus bar near the outer end portion o1 where the laser beam is first irradiated in the first welding line W1. Accordingly, a welding depth is not sufficiently formed near the outer end portion o1, and thus welding strength may be lower than the inner end portion i1.

However, as shown in the configuration of FIG. 5, when one welding spot is configured by the plurality of welding lines, i.e., the first welding line W1 together with the second welding line W2, deterioration of the welding strength in an outer portion or inner portion of the welding spot may be prevented or decreased, and thus weldability may be further improved.

In other words, in the configuration of FIG. 5, when a laser beam is first irradiated in a direction from the outer end portion o1 to the inner end portion i1 of the first welding line W1 so as to form the first welding line W1, the welding strength near the outer end portion o1 of the first welding line W1 may be somewhat decreased. However, by the time a laser beam is irradiated on the outer end portion o2 of the second welding line W2 so as to form the second welding line W2, sufficient heat is applied to an electrode lead during the forming of the first welding line W1, and thus laser welding may be performed at a sufficient depth. In other words, since the electrode lead is pre-heated by the first welding line W1 during the forming of the second welding line W2, the welding by the second welding line W2 may be satisfactorily performed. Accordingly, throughout the welding spot W, the welding strength may be sufficiently secured not only in an inner end portion, but also in an outer end portion.

Meanwhile, in the welding spot W having the tornado shape, an interval between welding lines, a diameter of a welding spot, the number of rotations of a spiral, a distance between inner end portions, etc. may be variously set according to various situations, such as a size, thickness, or material of an electrode lead or bus bar, the number or shape of a welding spot, etc.

For example, an interval between welding lines forming a tornado may be from 0.002 mm to 0.006 mm. In detail, an interval between the first welding line W1 and the second welding line W2 may be 0.003 mm to 0.004 mm.

As another example, a diameter of a welding spot, i.e., a maximum width of a tornado, may be 1.5 mm to 3 mm. In detail, in the configuration of FIG. 5, a distance between the outer end portion of the first welding line W1 and the outer end portion o2 of the second welding line W2 may be 2.0 mm to 2.5 mm.

As another example a distance between inner end portions in one tornado may be 0.15 mm to 0.25 mm. In detail, in the configuration of FIG. 5, a distance between the inner end portion i1 of the first welding line W1 and the inner end portion i2 of the second welding line W2 may be 0.2 mm. According to such a configuration, generation of a crack in a welding portion due to over-welding near an inner end portion or deterioration of weldability due to weak-welding may be prevented.

With respect to such various setting parameters, at least some parameters may be dependent on setting values of another parameter.

For example, when a diameter of a tornado forming one welding spot is 2.5 mm, an interval between welding lines may be between 0.0035 mm to 0.0045 mm. For example, a suitable interval between the welding lines may be 0.004 mm. In the tornado having such a diameter, when the interval between the welding lines is 0.003 mm, welding strength may be decreased due to over-welding. On the other hand, in the tornado having such a diameter, when the interval between the welding lines is 0.005 mm, weak-welding may occur.

Meanwhile, when a diameter of a tornado forming one welding spot is 2.0 mm, an interval between welding lines may be between 0.0025 mm to 0.0035 mm. For example, a suitable interval between the welding lines may be 0.003 mm. In the tornado having such a diameter, when the interval between the welding lines is 0.004 mm, a bus bar non-welding problem may occur due to weak-welding. On the other hand, in the tornado having such a diameter, when the interval between the welding lines is 0.002 mm, welding strength may be decreased due to over-welding.

Meanwhile, in following drawings including FIG. 5, the first welding line W1 and the second welding line W2 are shown in different thicknesses to be distinguished from each other, but the different thicknesses are only for convenience of description and do not indicate that welding thicknesses of two lines are different.

Also, in a configuration in which a plurality of welding lines in a spiral form one welding spot W, each outer end portion i.e., a plurality of outer end portions, of the plurality of welding lines may be configured to be positioned on opposite sides based on one center line.

For example, referring to the configuration of FIG. 5, the welding spot W may be divided into four quadrants based on a center point p of the welding spot W. Here, the center point p of the welding spot W is a point located at the center of the welding spot W, and for example, may be a center point of a circle using a distance between the outer end portions o1 and o2 of two welding lines as a diameter and passing the outer end portions o1 and o2. Also, as indicated by reference signs C11 and C12 of FIG. 5, two straight lines orthogonal to each other while passing the center point p of the welding spot W may be drawn. For example, a straight line passing the center point p while parallel to a Y-axis of FIG. 5 may be C11 and a straight line passing the center point p while parallel to a Z-axis of FIG. 5 may be C12. Then, four regions divided by the two straight lines C11 and C12 may be different quadrants. In detail, referring to FIG. 5, a region located at the upper right by the two straight lines C11 and C12 may be a first quadrant Q1, a region located at the upper left may be a second quadrant Q2, a region located at lower left may be a third quadrant Q3, and a region located at the lower right may be a fourth quadrant Q4.

As such, when the welding spot W is divided into four quadrants, the outer end portion o1 of the first welding line W1 and the outer end portion o2 of the second welding line W2 may be configured to be located on different quadrants. In particular, the outer end portion o1 of the first welding line W1 and the outer end portion o2 of the second welding line W2 may be configured to be located on quadrants that are not adjacent to each other but are opposite to each other. For example, as shown in FIG. 5, when the outer end portion o1 of the first welding line W1 is located in the third quadrant Q3, the outer end portion o2 of the second welding line W2 may be located in the first quadrant Q1 that is not adjacent to the third quadrant Q3 but is opposite. When one of the outer end portions o1 and o2 of the first and second welding lines W1 and W2, for example, the outer end portion o1 is located on the straight line C12, the other outer end portion, for example, the outer end portion o2 may also located on the straight line C12. However, in this case, the two outer end portions o1 and o2 may be located at sides opposite to each other based on the straight line C11.

According to such a configuration, the welding strength of the welding spot W having the tornado shape may be further improved. In particular, fatigue that may be generated near an end portion of at least one welding line is not concentrated on a certain portion but is distributed, and thus welding performance may be further improved.

Also, the welding spot W may be configured such that a straight line connecting inner end portions of the plurality of welding lines and a straight line connecting the outer end portions are parallel to each other. This is described in detail with reference to FIG. 6.

Figure 6:
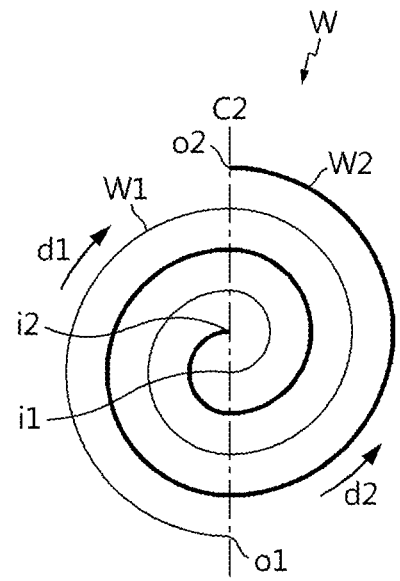
FIG. 6 is a diagram schematically showing a tornado shape of a welding spot according to another embodiment of the present disclosure.

FIG. 6 is a diagram schematically showing a tornado shape of the welding spot W according to another embodiment of the present disclosure. For example, FIG. 6 may illustrate another embodiment that may be applicable to the region B1 of FIG. 4. Hereinafter, detailed descriptions about features to which the descriptions about the above embodiment are applicable identically or similarly are omitted, and differences are mainly described. Such a description manner is applied to other several following embodiments.

Referring to FIG. 6, a straight line connecting the outer end portion o1 of the first welding line W1 and the outer end portion o2 of the second welding line W2 is C2. Also, a straight line connecting the inner end portion i1 of the first welding line W1 and the inner end portion i2 of the second welding line W2 is also C2. In other words, a straight line connecting the outer end portions o1 and o2 of the plurality of welding lines and a straight line connecting the inner end portions i1 and i2 of the plurality of welding lines form an angle of 0, and thus the two straight lines may be parallel to each other. In addition, the straight line connecting the outer end portions o1 and o2 and a straight line connecting the inner end portions i1 and i2 with respect to the plurality of welding lines may be one straight line C2. In other words, a tornado may be formed such that outer end portions and inner end portions of a plurality of welding lines are all on one straight line.

According to such a configuration of the present disclosure, a welding performance may be further improved. In particular, when a straight line connecting an outer end portion and an inner end portion of the tornado welding spot W is formed perpendicular to a direction where tension is performed, fatigue of an end portion may be decreased. For example, in the configuration of FIG. 6, in a situation in which the tension is mainly formed in a left-and-right direction, when straight lines connecting outer end portions and inner end portions of the welding spot W are all formed in a top-and-bottom direction, stress applied to an end portion of a welding line may be released.

Meanwhile, as in the above embodiment, when the welding spot W is configured such that one tornado is formed by a plurality of welding lines, for example, two welding lines, each welding line may be formed when a laser irradiating path moves in a direction from an outer end portion to an inner end portion or in a direction from an inner end portion to an outer end portion.

For example, in the configuration of FIG. 6, the first welding line W1 and the second welding line W2 may be formed in a form in which a laser beam is irradiated in a direction from an outer end portion to an inner end portion or in a direction from an inner end portion to an outer end portion.

In particular, a welding line that is formed relatively first may be formed as a laser beam is irradiated in a direction from an outer end portion to an inner end portion, and a welding line that is formed relatively later may be formed as a laser beam is irradiated in a direction from an inner end portion to an outer end portion.

For example, in the configuration of FIG. 6, when the first welding line W1 is formed before the second welding line W2, the first welding line W1 may be formed as a laser irradiating path moves in a direction from the outer end portion o1 to the inner end portion i1 as indicated by an arrow d1. Also, the second welding line W2 may be formed as a laser irradiating path moves in a direction from the inner end portion i2 to the outer end portion o2 as indicated by an arrow d2.

According to such a configuration of the present disclosure, since laser irradiation for forming the second welding line W2 starts again adjacent to a region where laser irradiation for forming the first welding line W1 ended, a laser irradiating time for forming the first and second welding lines W1 and W2 is reduced, and productivity may be improved.

Also, the welding strength may be relatively weakened because sufficient heat is not transferred to an electrode lead near the outer end portion o1 of the first welding line W1, but since sufficient heat is supplied near the outer end portion o2 of the second welding line W2 while the second welding line W2 is formed, the welding strength may be uniformly obtained in overall from the inside to outside of the welding spot W. Accordingly, weldability of the welding spot W may be further improved.

Also, the welding spot W may be configured such that inner end portions of a plurality of welding lines are connected to each other. This is described in detail with reference to FIG. 7.

Figure 7:
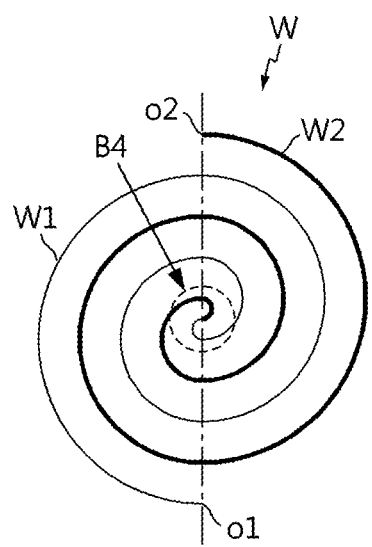
FIG. 7 is a diagram schematically showing a tornado shape of a welding spot according to another embodiment of the present disclosure.

FIG. 7 is a diagram schematically showing a tornado shape of the welding spot W according to another embodiment of the present disclosure. For example, FIG. 7 may illustrate another embodiment that may be applicable to the region B1 of FIG. 4.

Referring to FIG. 7, one tornado is formed by two welding lines W1 and W2 having spiral forms, wherein two welding lines may have inner end portions connected to each other as indicated by a region B4. In other words, in FIG. 7, the first and second welding lines W1 and W2 may each have a spiral form and include different outer end portions of and o2, wherein inner end portions are not separated from each other but are connected to each other.

According to such a configuration of the present disclosure, it may be said that a plurality of welding lines do not separately include an inner end portion. Accordingly, generation of a crack or the like due to generation of fatigue near an inner end portion may be prevented. Also, since processes of forming the plurality of welding lines, in particular, two welding lines, are continuously performed, a welding process may be more smoothly performed.

Also, the plurality of welding spots W may be provided with respect to one electrode lead 111.

For example, as shown in FIG. 4, the electrode lead 111 exposed externally, i.e., at the front, may be welded with another electrode lead and/or bus bar stacked together by being located at the back via the plurality of welding spots W. Here, as described above, the plurality of welding spots W may respectively have a tornado shape and may be spaced apart from each other by a certain distance.

In particular, the plurality of welding spots W may be arranged in a top-and-bottom direction (Z-axis direction of the drawing) with respect to one electrode lead. In detail, when a plurality of secondary batteries are arranged in a left-and-right direction (Y-axis direction of the drawing), electrode leads of the secondary batteries may contact each other while being stacked on each other in a front-and-back direction (X-axis direction of the drawing). At this time a contacting region between electrode leads and/or between an electrode lead and a bus bar may have an approximately rectangular shape, in which long sides are formed in the top-and-bottom direction (Z-axis direction of the drawing) and short sides are formed in the left-and-right direction (Y-axis direction of the drawing). In this case, the plurality of welding spots W may be arranged in a long-side direction, i.e., in the top-and-bottom direction, with respect to the contact region having such a rectangular shape. In other words, the plurality of welding spots W may be arranged to be spaced apart from each other by a certain distance along a length direction of a front exposure portion of the electrode lead.

According to such a configuration of the present disclosure, adhesion between the electrode leads and/or between the electrode lead and the bus bar may be further improved. In particular, since each welding spot W is formed in a tornado shape, weldability is excellent by itself, and in addition, since the plurality of welding spots W are spaced apart from each other by a certain distance, the weldability may be further stably maintained. In other words, since the plurality of welding spots W are separated from each other, even when a crack is generated in one welding spot W, it is difficult for the crack to grow up to the other welding spot W. Accordingly, a welding state of the electrode lead may be stably maintained. In addition, even when a battery module is frequently exposed to vibration or an impact, a crack is prevented from continuously growing by the vibration or impact, and thus generation of a defect in an electric connection state of the electrode leads may be prevented.

Also, according to such a configuration, when a weight is applied to the electrode lead or the like, the applied weight is distributed to the plurality of welding spots W, and thus a welded state of each welding spot W may be more stably maintained.

Moreover, as shown in FIGS. 3 and 4, when secondary batteries are arranged in a left-and-right direction and thus electrode leads are also arranged in the left-and-right direction, a direction in which force is mainly applied by vibration or an impact may be the left-and-right direction (Y-axis direction of the drawing), i.e., an arranged direction of the electrode leads. Here, as in the above configuration, when welding spots are arranged in a top-and-bottom direction (Z-axis direction of the drawing) with respect to one electrode lead, the plurality of welding spots may be arranged in a direction approximately orthogonal to a direction in which force is applied. Accordingly, welded states of the plurality of welding spots may be further stably maintained with respect to external force.

Moreover, in the above configuration, the plurality of welding spots provided in one electrode lead may be configured such that outer end portions are located on one straight line. This is described in detail with reference to FIG. 8.

Figure 8:
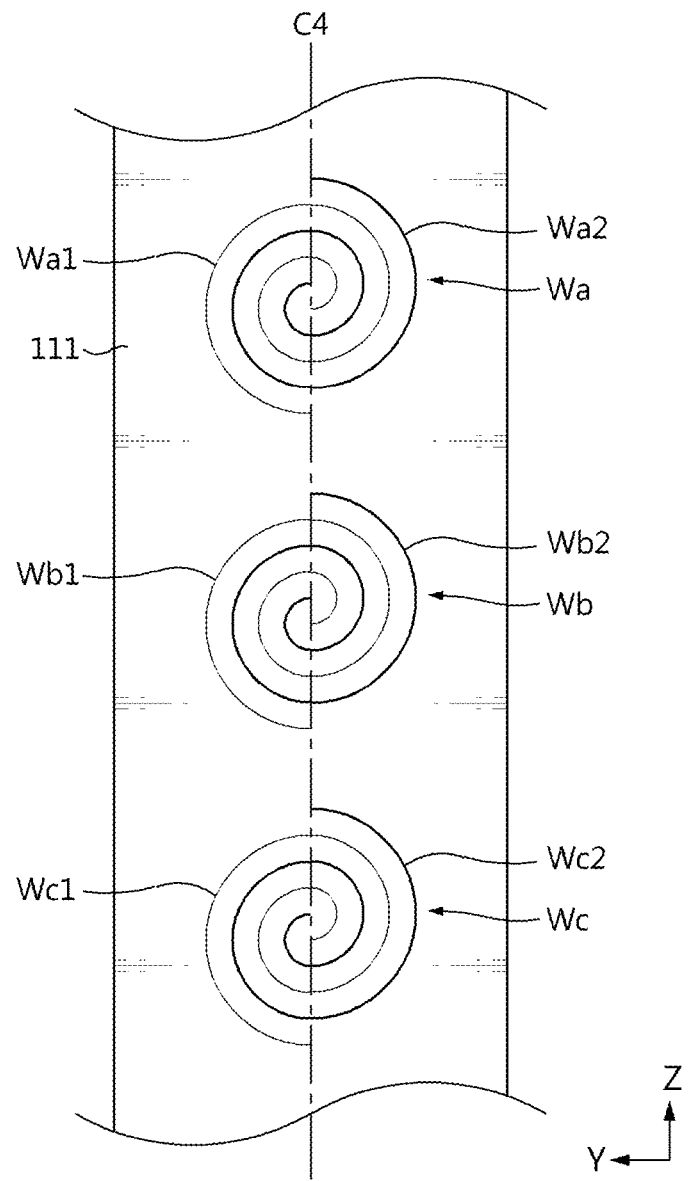
FIG. 8 is a diagram schematically showing a configuration of a plurality of welding spots included in an electrode lead, in a battery module according to an embodiment of the present disclosure.

FIG. 8 is a diagram schematically showing a configuration of a plurality of welding spots W included in an electrode lead, in a battery module according to an embodiment of the present disclosure. For example, FIG. 8 illustrates an example of an enlarged configuration of a region B2 of FIG. 4.

Referring to FIG. 8, a plurality, i.e., three, welding spots W are formed on an electrode lead while being spaced apart from each other by a certain distance in a top-and-bottom direction (Z-axis direction of the drawing). Here, a welding spot located relatively at the top may be referred to as a first welding spot Wa and remaining welding spots may be sequentially referred to as a second welding spot Wb and a third welding spot Wc in a downward direction. Also, such three welding spots may each have a tornado shape including two spirals, i.e., two welding lines.

In such a configuration, each outer end portion of a first welding line Wa1 and a second welding line Wa2 of the first welding spot Wa, each outer end portion of a first welding line Wb1 and a second welding line Wb2 of the second welding spot Wb, and each outer end portion of a first welding line Wc1 and a second welding line Wc2 of the third welding spot Wc may all be located on one straight line indicated by a reference sign C4. In other words, six outer end portions provided in three welding spots may all be located on the same straight line.

According to such a configuration of the present disclosure, weldability of an object to be welded may be further improved by a plurality of welding spots. In particular, as in the above embodiment, when secondary batteries are arranged in a left-and-right direction, a force by vibration or an impact, i.e., a tensile force, may be generated in the left-and-right direction. In this case, when outer end portions of welding spots each having a tornado shape are located on one straight line, and such a straight line is configured in a direction approximately orthogonal to a direction of the tensile force, weakening of weldability by fatigue formed at an outer end portion may be prevented or reduced.

Meanwhile, as described above, the welding spot W may be configured by welding between electrode leads and/or between an electrode lead and a bus bar.

In particular, the welding spot W may be configured such that a plurality of electrode leads and one bus bar are welded together. This is described in detail with reference to FIG. 9.

Figure 9:
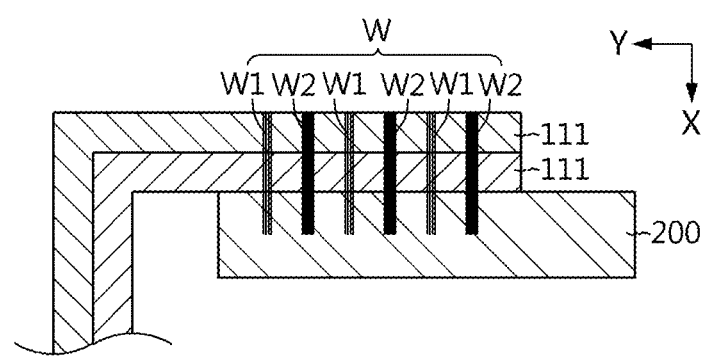
FIG. 9 is a cross-sectional view schematically showing a welding configuration between an electrode lead and a bus bar in a battery module, according to an embodiment of the present disclosure.

FIG. 9 is a cross-sectional view schematically showing a welding configuration between the electrode lead 111 and the bus bar 200 in a battery module, according to an embodiment of the present disclosure. For example, FIG. 9 illustrates an example of a cross-sectional configuration with respect to a line B3-B3' of FIG. 4. However, for convenience of description, only a part of the electrode lead 111 and the bus bar 200 are illustrated in FIG. 9.

Referring to FIG. 9, a plurality of electrode leads, i.e., the two electrode leads 111, are partially bent while overlapping each other in a left-and-right direction (Y-axis direction of the drawing), and bent end portions are attached to a front surface (top surface of FIG. 9) of the bus bar 200. In this case, it may be said that the two electrode leads 111 and the one bus bar 200 are stacked on a front-and-back direction (X-axis direction of the drawing).

In such a configuration, the two electrode leads 111 and the one bus bar 200, which are stacked on each other, may be welded via at least one welding spot W. Moreover, as shown in FIGS. 3 and 4, the two electrode leads 111 and the one bus bar 200, which are stacked on each other, may be welded to each other via a plurality of, for example, six to eight welding spots W.

Here, each welding spot W may include the first welding line W1 and the second welding line W2 as shown in FIG. 9, and two welding lines may each have a spiral form. For example, each welding spot W may have a form of any one of welding spot forms shown in FIGS. 5 through 8. Accordingly, in a cross section of a configuration in which two electrode leads and a bus bar are combined, a welding portion may be formed by a plurality of welding lines as shown in FIG. 9.

In such a configuration, the plurality of electrode leads 111 may include the same material and the bus bar 200 may include a material different from the electrode lead 111. For example, in the embodiment of FIG. 9, the two electrode leads 111 may be made of aluminum and the one bus bar 200 may be made of copper. In particular, such a configuration may be provided when a plurality of secondary batteries are electrically connected in parallel.

As such, when an electrode lead and a bus bar, which are combined and fixed to each other, include different materials, the electrode lead and the bus bar may be welded to each other via at least one welding spot having a tornado shape. In this case, weldability between a plurality of electrode leads and a bus bar may be stably secured. However, it is obvious that materials of the electrode lead and bus bar may vary according to various factors, such as a type of battery or battery pack, a characteristic of an apparatus to which a battery pack is applied, etc. For example, two electrode leads, i.e., a positive electrode lead and a negative electrode lead, may include different materials. In this case, one electrode lead and a bus bar may include the same material. Alternatively, two electrode leads and a bus bar may all include the same material.

Meanwhile, in FIG. 9, two electrode leads and one bus bar are stacked on and welded to each other, but this is only an example, and at least three electrode leads and one bus bar may be welded to each other while being stacked on each other. Also, in this case as well, a welding spot having a tornado shape as described above may be applied.

Also, preferably, the electrode lead may include a concave portion that is concave in an inward direction, and the welding spot may be configured such that at least a portion thereof is located in the concave portion. This is described in detail with reference to FIG. 10.

Figure 10:
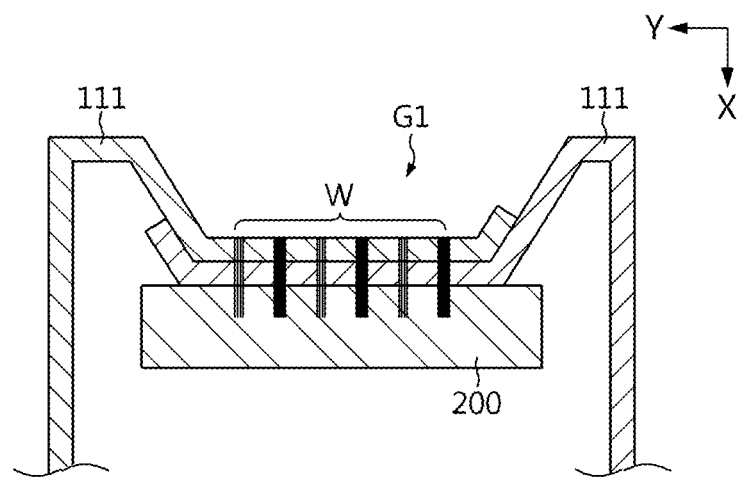
FIG. 10 is a cross-sectional view schematically showing a welding configuration of an electrode lead and a bus bar, according to another embodiment of the present disclosure.

FIG. 10 is a cross-sectional view schematically showing a welding configuration of the electrode lead 111 and the bus bar 200, according to another embodiment of the present disclosure. However, also in FIG. 10, only a part of the electrode lead 111 and the bus bar 200 are illustrated for convenience of description.

Referring to FIG. 10, the two electrode leads 111 may be stacked on and welded to a front surface (upper surface of FIG. 10) of the bus bar 200 by approaching from both sides based on the one bus bar 200. In such a configuration, the two electrode leads 111 may each include a concave portion that is concave in an inward direction (+X-axis direction of FIG. 10) as indicated by a reference sign G1 of FIG. 10. Here, the inward direction is a direction facing a center portion of a battery module or secondary battery, and may be a direction opposite to a direction in which an electrode lead protrudes from a body of the secondary battery. For example, based on FIG. 10, each electrode lead 111 may be configured to extend in an upward direction (−X-axis direction of the drawing), bend in a horizontal direction (Y-axis direction), bend in a downward direction again, and bend in the horizontal direction to form a concave portion, and an end portion thereof is bent again in the upward direction.

In this case, all or a part of the welding spot W may be located in the concave portion G1 formed by such bending of the electrode lead 111. In other words, as shown in FIG. 10, the welding spot W may be located in a region concavely formed in the two electrode leads 111.

According to such a configuration, adhesion between the electrode leads 111 may be further improved. In other words, not only the two electrode leads 111 are fixed to each other via the welding spot W, but also mechanical bonding strength may be further improved via combining of the concave portions G1. In other words, when a concave portion is formed at an electrode lead located relatively at the front (top of FIG. 10), a convex portion may be formed at the back of the electrode lead. Also, such a convex portion may be inserted into the concave portion of an electrode lead located at the back. Accordingly, the joint between electrode leads may be further improved by insertion between the electrode leads.

A tensile force applied to the welding spot W may be reduced by such a concave portion G1. For example, in the configuration of FIG. 10, when a force is applied in a left-and-right direction (Y-axis direction of the drawing), the concave portion G1 formed at an electrode lead may buffer the left-and-right direction force applied to the electrode lead. Accordingly, such a force is not transferred as it is, but is reduced and then transferred to the welding spot W formed at the concave portion G1.

Moreover, since a combined location between electrode leads or a location of a welding spot is easily determined and guided by the concave portion G1, combining and welding processes of the electrode leads may be further smoothly performed.

Meanwhile, in the above embodiments, one tornado, i.e., one welding spot, is provided by two welding lines in a spiral form, but a welding spot may be formed while at least three welding lines form one tornado.

Figure 11:
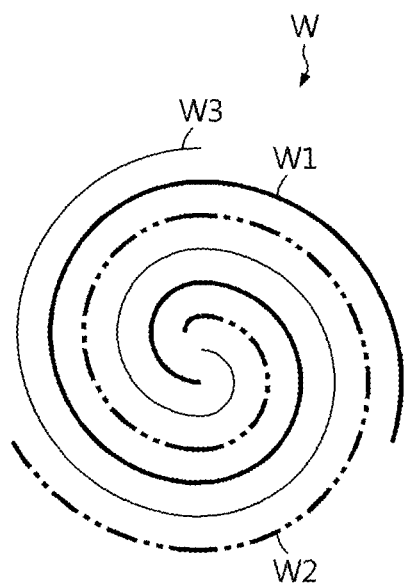
FIG. 11 is a diagram schematically showing a configuration of a welding spot according to another embodiment of the present disclosure.

FIG. 11 is a diagram schematically showing a configuration of the welding spot W according to another embodiment of the present disclosure.

Referring to FIG. 11, three welding lines W1, W2 and W3 are included in one tornado, i.e., one welding spot W, and each of the welding lines W1 through W3 may include an outer end portion and an inner end portion, separately. Also, the three welding lines W1, W2 and W3 may each be configured such that a shape from the outer end portion to the inner end portion has a spiral form.

Also, in the above embodiments, each welding line forming a tornado has a spiral form from an outer end portion to an inner end portion, but the present disclosure is not necessarily limited by such embodiments.

Figure 12:
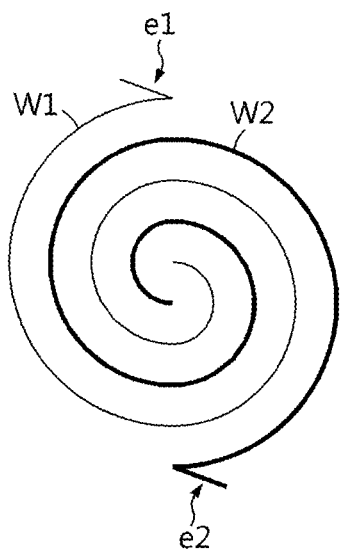
FIG. 12 is a diagram schematically showing a configuration of a welding spot according to another embodiment of the present disclosure.

FIG. 12 is a diagram schematically showing a configuration of a welding spot according to another embodiment of the present disclosure.

Referring to FIG. 12, two welding lines W1 and W2 are included in one tornado, and at this time, each welding line may have a form that is not a complete spiral in overall. In other words, as shown in FIG. 12, an outer end portion of the first welding line W1 and an outer end portion of the second welding line W2 may be configured in a bent shape as indicated by arrows e1 and e2. Moreover, at this time, bent end tip portions of the first and second welding lines W1 and W2 may be configured in a linear form.

In particular, according to such a configuration of the present disclosure, since a pattern of a welding line forming a tornado is not uniform but is changed, suppression with respect to growth of a crack may be increased. Also, via such a bent configuration of the welding line, fatigue applied an end tip portion of the welding line may be decreased.

Figure 13:
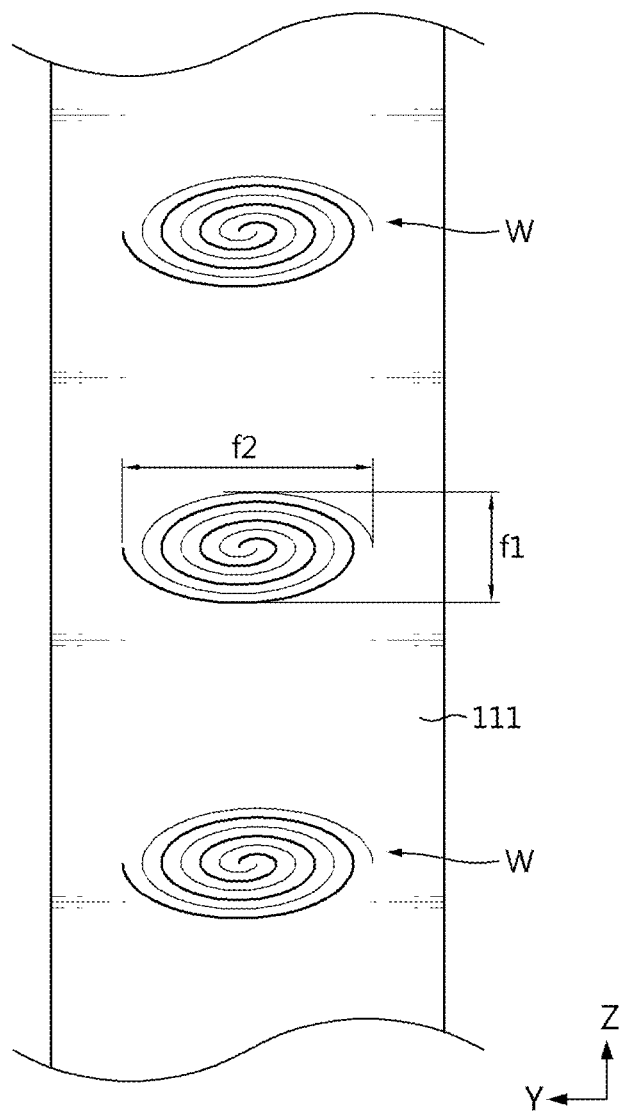
FIG. 13 is a diagram schematically showing a configuration of a welding spot according to another embodiment of the present disclosure.

FIG. 13 is a diagram schematically showing a configuration of the welding spot W according to another embodiment of the present disclosure.

Referring to FIG. 13, when the plurality of welding spots W are arranged on one electrode lead, each welding spot W configured in a tornado shape may be configured such that a width of an arrangement direction of the welding spot W is shorter than a width of a direction orthogonal to the arrangement direction. Here, the width may be a distance between outermost welding lines of the welding spot W. In particular, a width of the welding spot W may be a maximum distance among linear distances between the outermost welding lines of the welding spot W.

For example, when the at least two welding spots W are arranged in a top-and-bottom direction (Z-axis direction of the drawing) while a length of a width of the top-and-down direction of each welding spot W is f1 and a length of a width of a left-and-right direction (Y-axis direction of the drawing) of each welding spot W is f2, a tornado of each welding spot W may be configured such that f2 is larger than f1. In this case, each welding spot W may be configured in an approximately oval shape.

According to such a configuration of the present disclosure, even when an electrode lead has a short width (a length in the Z-axis direction of the electrode lead in the drawing), the number of welding spots W as much as possible may be included or a distance between the welding spot W may be increased. Also, a welding area as large as possible with respect to a contacting area of the electrode lead may be secured. Thus, according to such a configuration of the present disclosure, productivity regarding welding and welding strength may be further improved.

The battery module according to the present disclosure may further include a module case or the like in addition to the cell assembly 100 and the bus bar 200. Here, the module case may include an empty space therein so as to accommodate various components, such as the cell assembly 100, the bus bar 200, etc. in the empty space. In addition, the battery module according to the present disclosure may further include various components of a battery module, which is well-known at the time of filing of the present disclosure.

The battery pack according to the present disclosure may include at least one battery module according to the present disclosure. Also, the battery pack according to the present disclosure may further include, in addition to the battery module, a pack case for accommodating the battery module and various devices for controlling charging and discharging of the battery module, such as a battery management system (BMS), a current sensor, a fuse, etc.

The battery module according to the present disclosure may be applied to a vehicle, such as an electric vehicle or a hybrid vehicle. In other words, the vehicle according to the present disclosure may include the battery module according to the present disclosure. In particular, in the battery module according to the present disclosure, an electric connection state via welding of the electrode lead 111 and/or the bus bar 200 may be stably maintained despite of an impact or vibration. Accordingly, safety of the vehicle to which such a battery module is applied may be greatly improved.

The present disclosure will now be described more fully with reference to examples and comparative examples. The disclosure may, however, be embodied in many different forms and should not be construed as being limited to the examples set forth herein; rather, these examples are provided so that this disclosure will be thorough and complete, and will fully convey the concept of the disclosure to those skilled in the art.

Examples 1 Through 3

Figure 14:
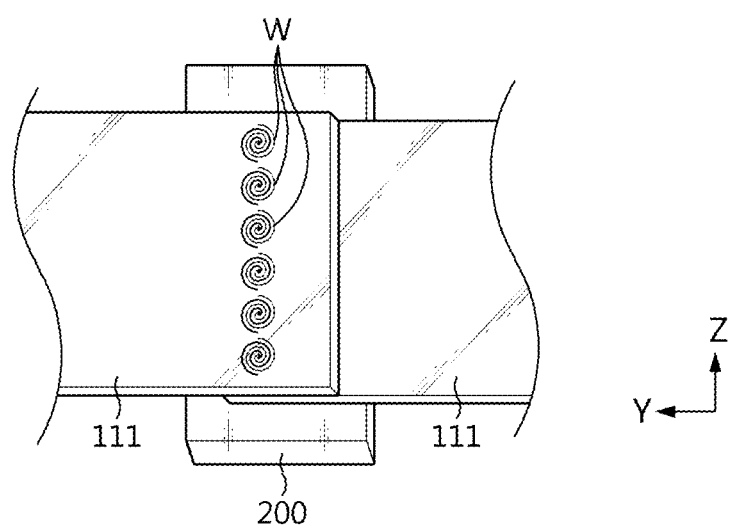
FIG. 14 is a diagram schematically showing a welding configuration of an electrode lead and a bus bar, according to an embodiment of the present disclosure.

As shown in FIG. 14, while two electrode leads 111, i.e., one positive electrode lead and one negative electrode lead, are stacked on each other in a front-and-back direction together with one bus bar 200, six welding spots 6 in a tornado shape were formed by using a laser welding equipment (FK-F6000-MM-CT) of Amada Miyachi Korea Co., Ltd so as to prepare three example samples in which the two electrode leads 111 and the bus bar 200 are welded to each other.

Here, in all example samples, the positive electrode leads were made of aluminum and had thicknesses of 0.2 mm, the negative electrode leads were made of copper and had thicknesses of 0.2 mm, and the bus bars 200 were made of copper and had a thickness of 0.6 mm.

Also, each welding spot was configured in a tornado shape shown in FIG. 8. Here, an outer diameter (length of longest width) of a tornado was about 3 mm, the number of tornados was 6, an interval between tornados was 3.4 mm, and an interval between welding lines was 0.004 mm.

Also, during laser welding, a laser output was 1.5 kW and a speed as 100 mm/s.

Comparative Examples 1 Through 3

Electrode leads and a bus bar including the same materials and having the same shapes as Examples 1 through 3 were stacked on each other in the same manner as Examples 1 through 3. Then, welding was performed between two electrode leads and the bus bar, and a welding form at this time was configured as in FIG. 1 to prepare samples of Comparative Examples 1 through 3.

In other words, in the samples of Comparative Examples 1 through 3, two welding lines were elongated in a width direction of the electrode lead, and two electrode leads and the bus bar were welded.

Here, an overall length of each welding line was 35 mm, and an interval between welding lines was 1.2 mm.

In such samples of Comparative Examples 1 through 3, the same laser welding equipment of Amada Miyachi Korea Co., Ltd as in the above examples was used to weld the two electrode leads and the bus bar. Also, a laser output during laser welding was 1.5 kW and a speed was 95 mm/s. Also, a length of a laser welding line in the samples of Comparative Examples 1 through 3 was approximately similar to an overall length of a laser welding portion of the samples of Examples 1 through 3.

Tensile strength was measured with respect to each of the example samples and comparative example samples, by using NA-TS250K of Nanotech Co., Ltd.

In a measuring method, a part of an electrode lead stacked at the top was cut or bent, and then an electrode lead stacked in the middle, i.e., an electrode lead contacting a bus bar, and the bus bar were pulled in opposite directions. For example, referring to the configuration of FIG. 14, the right electrode lead 111 stacked in the middle was pulled in a right direction and the bus bar 200 located at the bottom was pulled in a left direction. Also, strength of a welding portion being broken by such tensile force was measured and measuring results are shown in FIG. 15 with respect to Examples 1 through 3 and Comparative Examples 1 through 3.

Referring to FIG. 15, in the samples of Examples 1 through 3, tensile strength was from 46.484 kgf to 48.935 kgf, and an average of the tensile strength was measured to be 47.530 kgf. Here, base material strength is 57.270 kgf, and in this case, the measured value of the tensile strength is a value corresponding to about 82.99% of the base material strength. Meanwhile, in the samples of Comparative Examples 1 through 3, tensile strength was from 37.756 kgf to 41.972 kgf, and an average of the tensile strength was measured to be 40.371 kgf. This is a value corresponding to about 70.49% of base material strength when the base material strength is 57.270 kgf.

As shown in the measuring results, when at least one electrode lead and a bus bar are welded by using a plurality of welding spots formed in a tornado shape as in the present disclosure, tensile strength may be largely improved compared to a general welding configuration of a linear form. Moreover, despite that a laser welding speed of the example samples is faster than a laser welding speed of the comparative example samples, the example samples showed excellent tensile strength compared to the comparative example samples.

Examples 4 Through 6

Samples of Examples 4 through 6 were prepared in the same manner as in Examples 1 through 3 with approximately identical overall configurations, in particular, welding configurations, while varying only materials and/or thicknesses of an electrode lead and bus bar.

In other words, in Examples 4 through 6, positive electrode leads and negative electrode leads both were made of aluminum and had thicknesses of 0.4 mm. Also, bus bars were made of copper and had a thickness of 3.0 mm.

Examples 7 Through 9

Samples of Examples 7 through 9 were prepared in the same manner as in Examples 4 through 6 with approximately identical configurations of electrode leads and bus bars, while varying only welding configurations.

In other words, six welding spots were formed after stacking two electrode leads and a bus bar, wherein each welding spot was configured in a tornado shape having only one welding line in a spiral form, as shown in FIG. 16.

Here, a diameter of each welding spot, the number of welding spots, an interval between welding spots, and an interval between welding lines were similar to those of Examples 4 through 6, i.e., to those of Examples 1 through 3.

With respect to each of the samples of Examples 4 through 9, tensile strength was measured in the same manner and using the same equipment as in Examples 1 through 3. Then, measuring results are shown in FIG. 17 as Examples 4 through 9.

Referring to FIG. 17, in Examples 4 through 6, tensile strength of all samples was from about 134 kgf to 137 kgf, and thus all three samples showed similar tensile strength characteristics.

On the other hand, in Examples 7 through 9, one sample among three samples, i.e., the sample of Example 8, showed a result in which a measured value of the tensile strength is decreased below 130 kgf.

Based on such measuring results, it is determined that tensile strength is further improved and weldability is stably secured when a welding spot is configured in a tornado shape including a plurality of spirals, in particular, two spirals, rather than when a welding spot is configured in a tornado shape including one spiral, with respect to a tornado shape.

Following experiments were further performed for additional characteristic comparisons of a tornado welding shape including two welding lines as such and a tornado welding shape including one welding line.

Example 10

A sample of Example 10 having the same shape and welding configuration as the samples of Examples 4 through 6 was prepared.

Example 11

A sample of Example 11 having the same shape and welding configuration as the samples of Examples 7 through 9 was prepared.

Tensile strength was measured with respect to each of the samples of Examples 10 and 11 in a manner of measuring tensile strength by using NA-TS250K equipment, and consequent detachment was observed. Photographs of results of observing the detachment are shown in FIGS. 18 and 19.

In other words, FIG. 18 is an image captured to determine detachment while performing an experiment according to measurement of tensile strength with respect to Example 10, and FIG. 19 is an image captured to determine detachment while performing an experiment according to measurement of tensile strength with respect to Example 11.

First, referring to FIG. 18, as a result of testing the tensile strength, only base material itself was broken throughout all welding spots of Example 10, and detachment of a welding portion was not observed.

Meanwhile, referring to FIG. 19, as a result of testing the tensile strength, detachment of a welding portion was observed in some (two) welding spots among the plurality of welding spots of Example 11. In other words, as in a region indicated by an arrow H in FIG. 19, the welding portion was detached without the base material being broken in some welding spots, in the welding configuration according to Example 11.

According to such test results, it may be found that when each welding spot includes a plurality of welding lines in a spiral form, i.e., two welding lines in a spiral form, a welding portion is not easily detached and welding may be more easily performed at stronger strength compared to when one welding line in a spiral form is provided. Accordingly, it may be found that reliability with respect to welding is further improved in a welding spot in which a tornado is formed by including at least two welding lines in a spiral form.

Meanwhile, when at least one electrode lead and a bus bar are overlapped and welded to each other during mass production of a battery module, a gap may be generated in some degree between the electrode lead and the bus bar, and such a gap may greatly affect the mass production. Thus, in relation to a welding defect according to the generation of such a gap, following experiments were performed to examine effects of the present disclosure.

Examples 12 Through 26

Samples of Examples 12 through 26 were prepared in the same manner as in Examples 1 through 3 with approximately identical overall configurations, in particular, welding configurations, while varying only materials and/or thicknesses of an electrode lead and bus bar.

In other words, in Examples 12 through 26, positive electrode leads were made of aluminum and had a thickness of 0.4 mm, and negative electrode leads were made of copper and had a thickness of 0.2 mm. Also, bus bars were made of copper and had a thickness of 3 mm.

Also, the samples of Examples 12 through 26 were configured in a tornado shape as shown in FIG. 8, wherein an outer diameter of a tornado was about 3 mm, the number of tornados was six, an interval between tornados was 3.4 mm, and an interval between welding lines was 0.004 mm. Also, during laser welding, a laser output was 1.5 kW and a speed was 100 mm/s. Here, as in the above examples, FK-F6000-MM-CT of Amada Miyachi Korea Co., Ltd was used as the laser welding equipment.

In particular, in Examples 12 through 26, a gap between an electrode lead and a bus bar is varied. In other words, with respect to 15 samples of Examples 12 through 26, the electrode lead and the bus bar were welded while varying a gap between the electrode lead stacked in the middle and directly contacting the bus bar and the bus bar located therebelow in a range from 0.04 mm to 0.6 mm. Here, the gap between the electrode lead and the bus bar maintained a distance by disposing an intermediate material in a certain portion of the space formed by the separation of the electrode lead and the bus bar. The gap between the electrode lead and the bus bar in the samples of Examples 12 through 26 is shown in the table of FIG. 20.

Comparative Examples 4 Through 18

Figure 1:
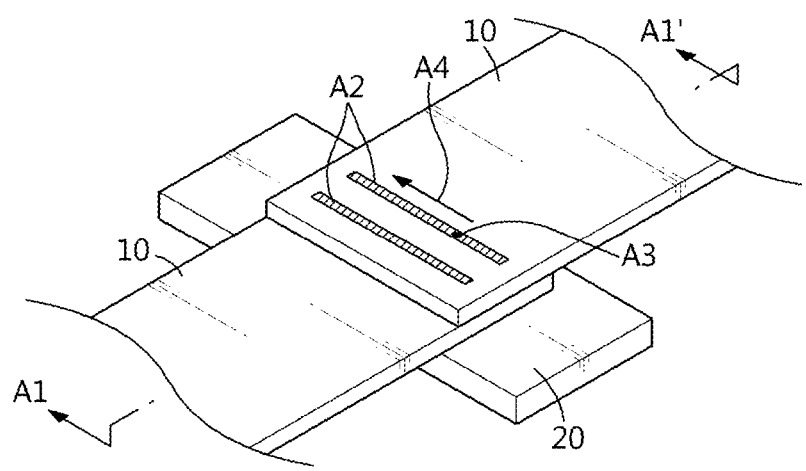
FIG. 1 is a partial perspective view schematically showing a configuration in which an electrode lead and a bus bar are welded to each other in a general battery module.
Figure 2:
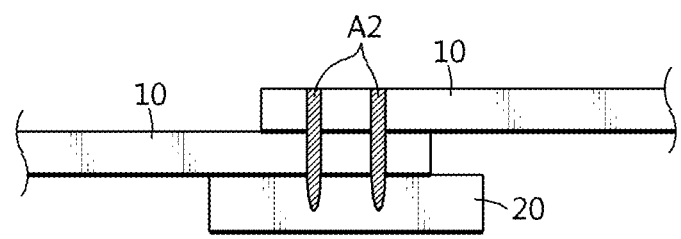
FIG. 2 is a cross-sectional view taken along a line A1-A1' of FIG. 1, in which a welded portion is illustrated.

Electrode leads and bus bars having the same materials and shapes as in Examples 12 through 26 were stacked on each other in the same manner as in Examples 12 through 26. Then, the two electrode leads and the bus bar were welded, and at this time, welding configurations were as in Comparative Examples 1 through 3. In other words, in Comparative Examples 4 through 18, two electrode leads and a bus bar were welded via two welding lines in a linear form, as shown in FIG. 1. Here, an overall length of a welding line was 35 mm, a gap between welding lines was 1.2 mm, a laser output was 1.5 kW, and a speed was 95 mm/s. In this case as well, as in the above comparative examples, FK-F6000-MM-CT of Amada Miyachi Korea Co., Ltd was used as the laser welding equipment In particular, like Examples 12 through 26, a gap between an electrode lead and a bus bar was sequentially varied in Comparative Examples 4 through 18. In other words, a gap between an electrode lead and a bus bar in Comparative Examples 4 through 18 was configured to be identical to that in Examples 12 through 26 as shown in FIG. 20. Also, welding in a linear form was performed on each of comparative example samples whose gaps are differently configured.

First, with respect to Examples 12 through 26 and Comparative Examples 4 through 18, visual defects, such as machine burns, pores, bead abnormality, and cracks, were observed with naked eyes, and results thereof were shown in FIG. 21. Here, 'x' is indicated when no particular defect is observed in FIG. 21. On the other hand, 'o' is indicated with respect to a sample having a defect in FIG. 21.

Referring to the results of FIG. 21, first, in examples, no particular defect was observed with naked eyes from Examples 12 through 19. In other words, according to examples of the present disclosure, a large defect was not generated when a gap between an electrode lead and a bus bar was within a range of 0.04 mm to 0.32 mm. Also, in the examples, a defect was observed in samples with naked eyes not until a gap between an electrode lead and a bus bar was equal to or greater than 0.36 mm.

On the other hand, in comparative examples, no particular defect was observed with naked eyes in Comparative Examples 4 through 6. However, in comparative example samples, a defect was observed with naked eyes from Comparative Examples 7 through 18. In other words, in comparative examples, a defect was observed with naked eyes even when a gap between an electrode lead and a bus bar was equal to or greater than 0.16 mm.

According to such experiment results, it may be found that a defect is not easily generated in the present disclosure compared to the comparative examples, even when a gap exists between an electrode lead and a bus bar in some degree. Thus, according to the present disclosure, even when a gap is generated to a certain degree between an electrode lead and a bus bar on a mass production line of a battery module, a defective rate may be remarkably reduced, and accordingly, mass productivity may be remarkably improved.

Figure 22:
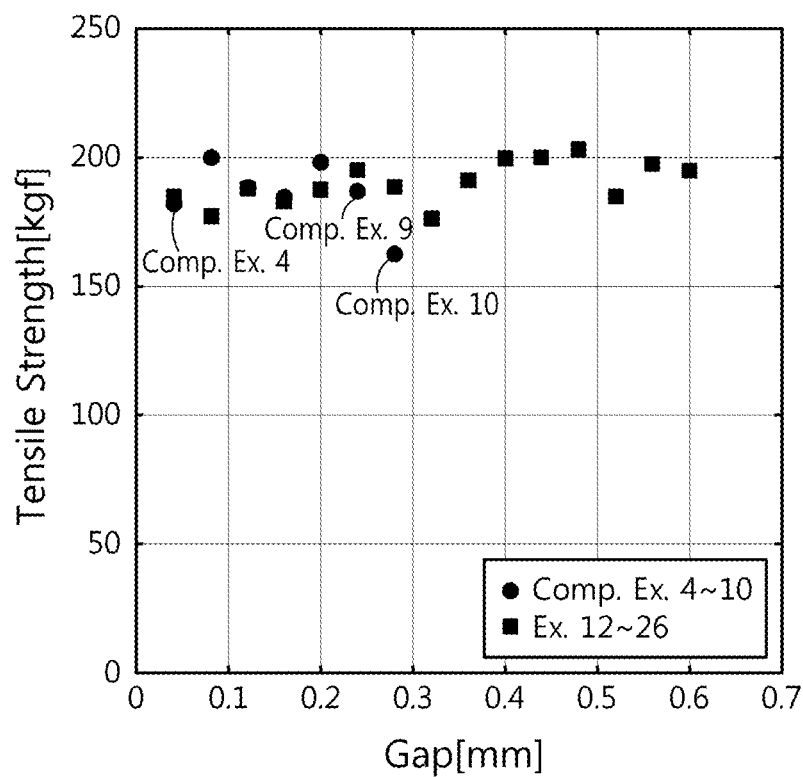
FIG. 22 shows results of measuring tensile strength with respect to the several examples and the comparative example samples of FIG. 20.

Next, tensile strength of the samples of Examples 12 through 26 and Comparative Examples 4 through 18 was measured by using NA-TS250K equipment, and results thereof are shown in FIG. 22.

Referring to the results of FIG. 22, in Examples 12 through 26, the tensile strength of all 15 samples was measured to be within a range of about 175 kgf to about 210 kgf. On the other hand, in comparative example samples, the tensile strength was measured to be within a range of about 175 kgf to about 210 kgf only with respect to Comparative Examples 4 through 9 in which a gap (interval between an electrode lead and a bus bar) was set to be equal to or less than 0.24 mm, and the tensile strength was measured to be low, i.e., less than 170 kgf with respect to Comparative Example 10 in which a gap was 0.28 mm. Moreover, an electrode lead and a bus bar were immediately separated during the test of tensile strength with respect to samples of Comparative Examples 11 through 18 in which a gap was 0.32 mm or higher. In other words, it may be determined that welding is not properly performed on the samples of Comparative Examples 11 through 18. Accordingly, tensile strength is unable to be measured with respect to such comparative example samples, and thus is not shown in FIG. 22.

According to such comparative examples, when an electrode lead and a bus bar are welded to each other via a tornado pattern as in examples of the present disclosure, it may be determined that weldability is stably secured even when the electrode lead and the bus bar are somewhat separated. In particular, referring to the measuring results of the comparative examples, an electrode lead and a bus bar were not properly welded to each other when the electrode lead and the bus bar were separated even by 0.32 mm, but according to the examples of the present disclosure, weldability may be stably maintained even when an electrode lead and a bus bar were separated by 0.6 mm. Moreover, in the comparative examples, tensile strength started to decrease in Comparative Example 10 in which a gap between an electrode lead and a bus bar was 0.28 mm, whereas in the examples of the present disclosure, tensile strength did not decrease even when an interval between an electrode lead and a bus bar continuously increased.

Accordingly, in a battery module according to the present disclosure, even when a gap is generated between an electrode lead and a bus bar due to various factors, such as a process limitation, error, interference of impurities, or the like during manufacturing processes, weldability between electrode leads and/or between an electrode lead and a bus bar may be stably maintained.

FIG. 23 is a diagram schematically showing a configuration of a plurality of welding spots Wd, We, and Wf included in an electrode lead in a battery module, according to another embodiment of the present disclosure. For example, FIG. 23 illustrates another example of an enlarged configuration of the region B2 of FIG. 4. In the current embodiment, details that are different from the above embodiments are mainly described, and details to which descriptions about the above embodiments are applicable identically or similarly are omitted.

Referring to FIG. 23, the three welding spots Wd, We, and Wf are included in one electrode lead, and each of the welding spots Wd, We, and Wf may be configured in a tornado shape including two welding lines in a spiral form.

In particular, in the current embodiment, at least two welding spots may be configured such that straight lines connecting outer end portions are in different directions. In detail, in the configuration of FIG. 23, straight lines connecting outer end portions of each of the three welding spots Wd, We, and Wf may be formed in different directions. For example, as shown in FIG. 23, a straight line connecting outer end portions of two welding lines Wd1 and Wd2 with respect to the welding spot Wd is C5, a straight line connecting outer end portions of two welding lines We1 and We2 with respect to the welding spot We is C6, and a straight line connecting outer end portions of two welding lines Wf1 and Wf2 with respect to the welding spot Wf is C7. At this time, the straight lines C5, C6, and C7 may not be parallel to each other. For example, the straight line C6 may be tilted by an angle of about 30° with respect to the straight line C5, and the straight line C7 may be tilted by an angle of about 60° with respect to the straight line C5. In such a configuration, at least two welding spots provided in one electrode lead may not be formed in the completely identical shape, but be rotated by certain angles within a range higher than 0° and lower than 360° based on center points of the welding spots.

In particular, when a plurality of, for example, at least four welding spots are provided in one electrode lead, straight lines connecting outer end portions of each welding spot may not be parallel to each other with respect to all welding spots. In other words, all welding spots in one electrode lead may not be identically formed, but may be rotated by certain angles based on center points.

According to such a configuration of the present disclosure, weldability between electrode leads and/or between an electrode lead and a bus bar may be stably secured even when tensile force is applied in any direction. In other words, according to such configurations, it may be said that welding directions of welding lines at outer end portions are differently formed with respect to a plurality of welding spots. Thus, in this case, fatigue of the outer end portions may vary according to welding spots even when stress is applied in a certain direction, and a welding spot in which weldability is strongly maintained may exist. Accordingly, weldability may be stably secured regardless of a direction of tensile force applied to an electrode lead.

The present disclosure has been described in detail. However, it should be understood that the detailed description and specific examples, while indicating preferred embodiments of the disclosure, are given by way of illustration only, since various changes and modifications within the scope of the disclosure will become apparent to those skilled in the art from this detailed description.

EXPLANATION OF REFERENCE NUMERALS

10: Electrode Lead
20: Bus Bar
100: Cell Assembly
110: Secondary Battery
111: Electrode Lead
200: Bus Bar
W: Welding Spot
W1: First Welding Line, W2: Second Welding Line

What is claimed is:

1. A battery module comprising:
a cell assembly comprising a plurality of secondary batteries stacked in at least one direction, respectively comprising electrode leads, and electrically connected to each other via a connection between the electrode leads; and
at least one bus bar comprising an electrically conductive material, the at least one bus bar being electrically connected by contacting the electrode leads of the plurality of secondary batteries,
wherein at least one of the electrode leads is combined and fixed to at least one of another electrode lead and the at least one bus bar, which are contacted by the at least one of the electrode leads, via a welding spot formed in a tornado shape, and wherein the welding spot is configured in a shape comprising a plurality of welding lines in a spiral form.

2. The battery module of claim 1, wherein:

the welding spot is configured in a shape in which the plurality of welding lines have a same rotating direction; and at least a portion of one of the plurality of welding lines is inserted between another one of the plurality of welding lines.

3. The battery module of claim 1, wherein the welding spot is configured such that a straight line connecting an inner end of each of the plurality of welding lines and a straight line connecting an outer end of each of the plurality of welding lines are parallel to each other.

4. The battery module of claim 1, wherein the welding spot is configured such that inner ends of the plurality of welding lines are connected to each other.

5. The battery module of claim 1, wherein a plurality of the welding spots are provided with respect to a single electrode lead.

6. The battery module of claim 5, wherein the plurality of welding spots provided with respect to the single electrode lead are configured such that outer ends are positioned on one straight line.

7. The battery module of claim 1, wherein the welding spot is configured to weld one of the at least one bus bar and at least two of the electrode leads that are stacked on each other.

8. The battery module of claim 1, wherein:

the electrode leads each comprise a concave portion formed concavely in an inward direction; and at least a portion of the welding spot is positioned in the concave portion of one of the electrode leads.

9. A battery pack comprising the battery module of claim 1.

10. A vehicle comprising the battery module of claim 1.

* * * * *